(12) United States Patent
Houtveen

(10) Patent No.: US 7,578,540 B2
(45) Date of Patent: Aug. 25, 2009

(54) VEHICLE SLIDING DOOR ACTUATOR

(75) Inventor: Timotheus Gregorius Hendrikus Houtveen, Achterveld (NL)

(73) Assignee: Actuall Doorlift Systems B.V., Amersfoort (NL)

( * ) Notice: Subject to any disclaimer, the term of this patent is extended or adjusted under 35 U.S.C. 154(b) by 183 days.

(21) Appl. No.: 11/732,510

(22) Filed: Apr. 3, 2007

(65) Prior Publication Data

US 2008/0034663 A1 Feb. 14, 2008

(30) Foreign Application Priority Data

Aug. 11, 2006 (NL) .................................. 2000177

(51) Int. Cl.
*E05F 11/06* (2006.01)
*B60J 5/14* (2006.01)

(52) U.S. Cl. ...................... 296/146.8; 49/358; 160/188

(58) Field of Classification Search .................... 49/358, 49/360; 74/424.77; 160/188, 189, 113, 114, 160/115, 116, 117, 118, 119; 296/50, 106, 296/146.8, 155; 174/50, 481, DIG. 9
See application file for complete search history.

(56) References Cited

U.S. PATENT DOCUMENTS

| | | | | |
|---|---|---|---|---|
| 1,817,909 A | * | 8/1931 | Blodgett | 160/189 |
| 2,786,712 A | * | 3/1957 | Whiting | 296/106 |
| 2,992,040 A | * | 7/1961 | Carlsson et al. | 296/100.12 |
| 3,331,428 A | * | 7/1967 | Ford | 160/331 |
| 3,397,488 A | * | 8/1968 | Goldstein | 49/199 |
| 3,427,521 A | * | 2/1969 | Goldstein | 318/266 |
| 3,620,284 A | * | 11/1971 | Shayman et al. | 160/11 |
| 3,792,189 A | * | 2/1974 | Stengel et al. | 174/69 |
| 4,905,542 A | * | 3/1990 | Burm et al. | 74/625 |
| 5,536,061 A | * | 7/1996 | Moore et al. | 296/155 |
| 6,174,020 B1 | * | 1/2001 | Knettle et al. | 296/155 |
| 6,179,036 B1 | * | 1/2001 | Harvey | 160/188 |
| 6,254,176 B1 | * | 7/2001 | Hare | 296/211 |
| 6,494,523 B2 | * | 12/2002 | Kobayashi | 296/155 |
| 6,517,365 B1 | * | 2/2003 | Bungo et al. | 439/162 |
| 6,682,353 B2 | * | 1/2004 | Bigotto | 439/34 |
| 6,781,058 B1 | * | 8/2004 | DeCicco et al. | 174/72 A |
| 6,818,827 B2 | * | 11/2004 | Kato et al. | 174/72 A |
| 6,878,873 B2 | * | 4/2005 | Fryberger et al. | 174/481 |
| 2002/0125735 A1 | * | 9/2002 | Rogers et al. | 296/155 |
| 2003/0184119 A1 | * | 10/2003 | Doshita et al. | 296/155 |
| 2005/0217806 A1 | * | 10/2005 | Bruno et al. | 160/189 |
| 2006/0185879 A1 | * | 8/2006 | Kayumi | 174/50 |

FOREIGN PATENT DOCUMENTS

| | | | |
|---|---|---|---|
| EP | 222300 A1 | * | 5/1987 |
| EP | 291171 A2 | * | 11/1988 |
| JP | 03110283 A | * | 5/1991 |
| JP | 03248915 A | * | 11/1991 |

* cited by examiner

*Primary Examiner*—Glenn Dayoan
*Assistant Examiner*—Paul A Chenevert
(74) *Attorney, Agent, or Firm*—The Webb Law Firm

(57) ABSTRACT

A vehicle sliding door actuator including a profile section provided with a rail track in which a movement unit is placed so as to be movable, and a cable duct along the rail track, provided with a coiled cord in the cable duct which at one end is connected to the movement unit and at its other end near one end of the cable duct.

9 Claims, 4 Drawing Sheets

VEHICLE SLIDING DOOR ACTUATOR

BACKGROUND OF THE INVENTION

The invention relates to a vehicle sliding door actuator, in particular a vehicle sliding door actuator provided with electric drive.

A number of types of sliding door actuators for vehicles are available on the market. In a known embodiment an electric motor is set up in a fixed position in a load compartment of a lorry, and a sliding door is moved between a closed and an open position by means of a chain transmission.

In another known embodiment an electric motor mounted near the upper side of a load compartment drives a shaft extending over the width of the load compartment of the lorry, and said shaft is provided on both ends with gearwheels running in a gear rack track. The electric motor and the shaft extending over the width move through the load compartment in the longitudinal direction of the vehicle and drive the sliding door in the process.

In yet another already known embodiment a gear rack track is mounted centrally on the upper side in a load compartment of a vehicle, and an electric motor provided with geared transmission moves along the gear rack track, driving the sliding door in the process.

The existing embodiments are, however, rather difficult to install in a load compartment of a vehicle because they either take up too much space or have to be mounted in places that take up expensive loading space. Furthermore, it has been found that such installations can only be made in such a way that they are unable to meet, for example, climatologic conditions in a load compartment because, for example, the power supply or cables are difficult to make sufficiently insulating.

Furthermore, these known actuators are difficult to install, especially in existing vehicles.

SUMMARY OF THE INVENTION

The object of the invention is to provide an actuator for a sliding door which is easy to install, especially in existing vehicles.

A further object of the invention is to provide an actuator which can easily be coupled to the electrical system of a vehicle.

Yet a further aspect of the invention is to provide an actuator which can operate in a save and reliable way in the load compartment of a lorry, especially under climatologically challenging conditions.

To that end, the invention provides a vehicle sliding door actuator comprising a profile section provided with a rail track in which a movement unit is placed so as to be movable, and a cable duct along the rail track, provided with a coiled cord in the cable duct which at one end is connected to the movement unit and at its other end near one end of the cable duct.

Through the manner of power supply and integration of various functionalities in the guide section, it has been found possible to develop a sliding door actuator which, on the one hand, is reliable and maintenance-free and is virtually unsusceptible to faults and, on the other hand, is very easily insulated, so that it meets for instance the IP 69 international standard, which makes it very suitable for use in refrigerated vehicles and for other applications in the case of which high standards are set for the reliability and the electronic insulation of the installation.

The movement unit runs along the profile section.

In particular, in the extruded section the various ducts are provided next to each other, so that a flat construction is possible, which is advantageous in a load compartment of a lorry. In fact, the actuator is so flat that it can fit between the roof and the sliding door in existing vehicles.

In another aspect of the invention, the actuator can be used in buildings for operating doors.

BRIEF DESCRIPTION OF THE DRAWINGS

One embodiment of the vehicle sliding door actuator according to the invention is described and illustrated in the appended figures, in the case of which.

DETAILED DESCRIPTION OF EMBODIMENTS

Figure 1:
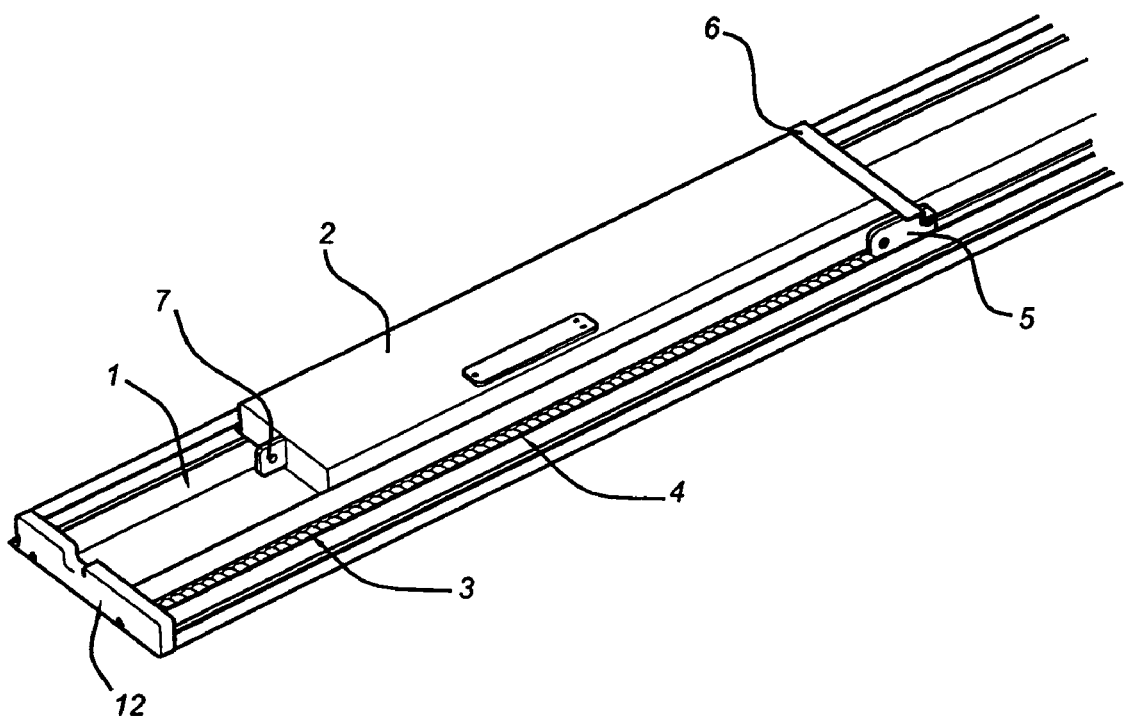
FIG. 1 shows an embodiment of the vehicle sliding door actuator.

FIG. 1 shows an embodiment of an actuator for a sliding door for a vehicle according to the invention. It shows a rail track 1, which is preferably in the form of an extruded aluminium section here, and which can be fixed on a vehicle roof inside a cargo compartment. A movement unit 2 is mounted on said extruded section in such a way that it is movable along the profile section 1. Furthermore, the extruded section 1 is provided with a cable duct 3, which is adapted to accommodate a coiled cord 4, and which is co-moulded in one piece on the rail track 1. The coiled cord 4 runs through cable duct 3 and is attached to a pull relief 5 at one end. A connecting rod 6, or connecting section 6, is connected to said pull relief at one end of the movement unit 2. The connecting section is connected to the pull relief 5 in such a way that it acts upon it. The pull relief 5 is accommodated partially in the cable duct 3 in such a way that it is movable.

The movement unit 2 is provided with a fixing part 7 near the opposite end. Said fixing part 7 can be connected by means of a rod or wire to an upper side of a sliding door. The rail track 1 is furthermore provided with an end cap 12.

The movement unit 2 is provided with an electric drive unit, an electric motor with its drive shaft in the longitudinal direction of the section. Gearwheels that are disposed in the plane of the profile section are driven by means of a right-angled transmission. Said gearwheels mesh with the gear rack track with the teeth also in the same plane. This is not illustrated. The coiled cable provides the drive in the movement unit with electric power and control if necessary. An example of such a drive is shown in EP-B1-1,018,312. In this embodiment, in order to make the actuator as flat as possible, one or more electro motors are installed with their shafts parallel to the longitudinal direction of the profile section 1. The shafts are provided with for instance a worm wheel which drives the gear wheels which are mounted with their rotational axes perpendicular to the plane of the profile section. These gear wheels mesh with the gear rack track which can be installed in accommodation space (rail) 9 in the profile section.

Figure 2:
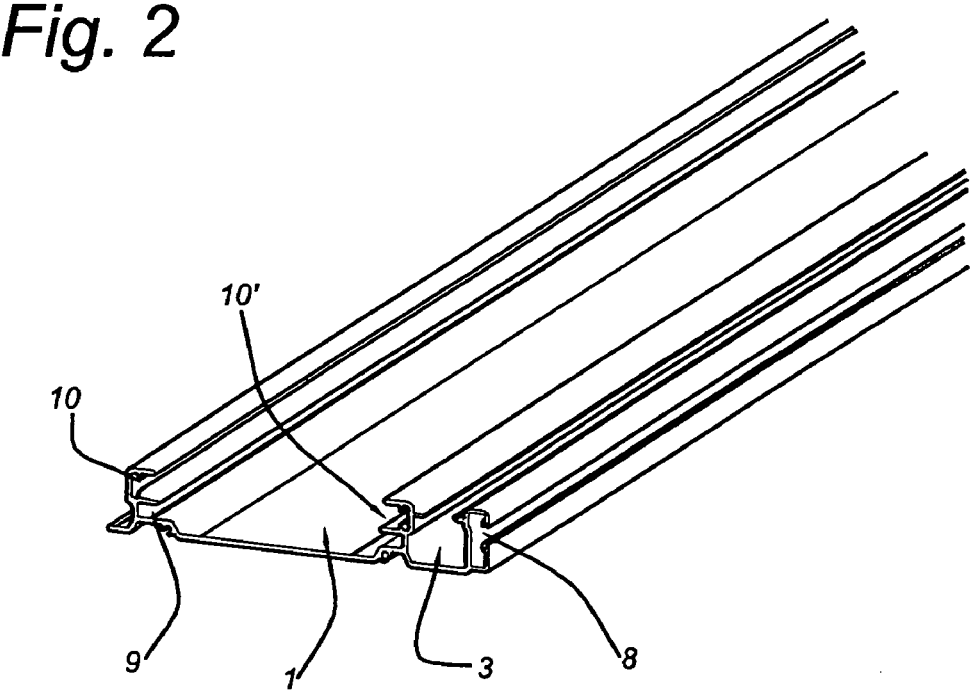
FIG. 2 shows a section and perspective view of the rail track of the vehicle sliding door actuator of FIG. 1.

FIG. 2 shows a cross section of a part of the rail track 1, which is in the form of an extruded aluminium section here. The extruded section 1 is provided with the already mentioned co-moulded cable duct 3, in which coiled cord 4 can run. The extruded section is furthermore provided with a further duct 8, in which various sensors can be fitted, for example for cut-out or other purposes, and also the cables for said sensors. One sensor can for instance be a stop indicator which provides a signal when the movement unit has to stop, for instance because the sliding door is close. Placing such a sensor in the duct 8, and attaching it in a displaceable way, the actuator becomes more versatile.

Furthermore, the extruded section 1 is provided with an accommodation space 9, in which a gear rack provided with teeth can be placed, which gear rack functions as a gear rack track. Said gear rack track can be made of, for example, plastic such as nylon, and can be slid into said accommodation space 9 of the section 1.

The section 1 is furthermore provided with guide rails 10 and 10', in which guide ends of the movement unit 2 can run.

Figure 3:
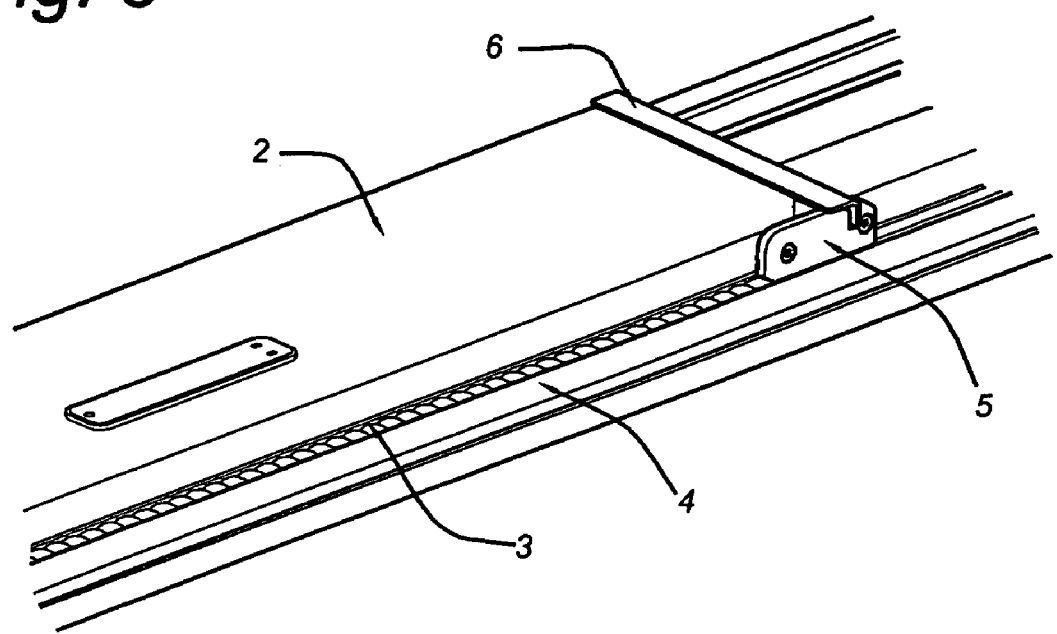
FIG. 3 shows a further detail of the vehicle sliding door actuator of FIG. 1.

FIG. 3 shows a detail of the actuator of FIG. 1 at the end of the profile section and with the pull relief 5. It can be seen clearly here how the movement unit 2 is provided at one end with a corner strip 6, which engages in a recessed part of the pull relief 5.

Figure 4:
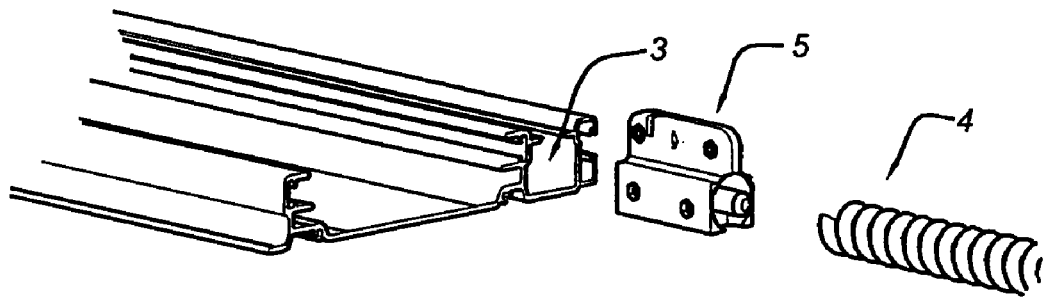
FIG. 4 shows a further detail of the vehicle sliding door actuator of FIG. 1.

FIG. 4 is an exploded view of a part of the section 1, in particular the cable duct 3, which is co-moulded integrally with the extruded section, the pull relief 5 and also the coiled cable 4. Part of the shape of pull relief 5 is adapted to the cross section of cable duct 3 so that it can move, i.e. run, through said cable duct, and the pull relief 5 has a part projecting from the cable duct 3.

Figure 5:
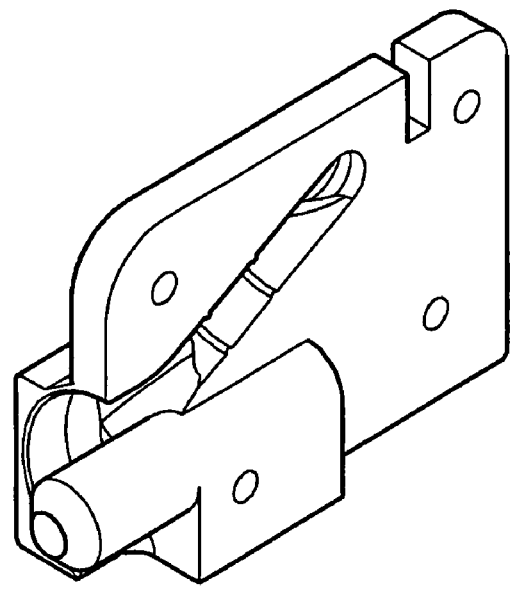
FIG. 5 shows a further detail of the vehicle sliding door actuator of FIG. 1.

The pull relief 5 is composed here of two plastics parts. One of the halves of the pull relief 5 is shown in FIG. 5. This half of the pull relief 5 is provided with a pin, which extends in the open heart of the coiled cable. Furthermore, this part is provided with a channel through which a cable end of the coiled cord can be passed for feeding further to the movement unit 2. Said channel is provided with edges here, in order to form a pull relief function.

Figure 6:
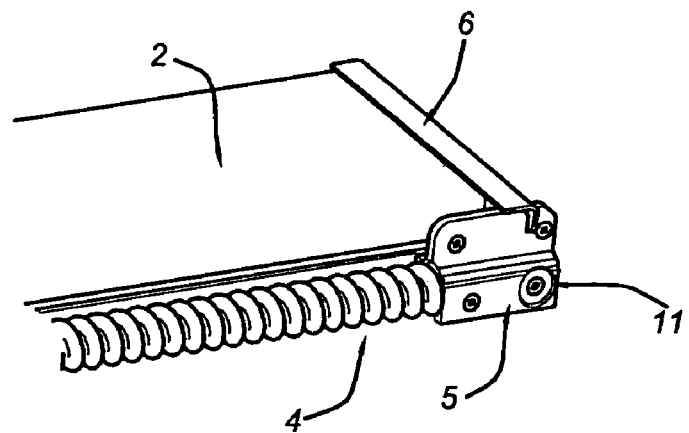
FIG. 6 shows a further detail of the vehicle sliding door actuator of FIG. 1.

FIG. 6 shows in detail one end of the movement unit 2 provided with the corner strip 6, which engages in the pull relief 5 provided with the coiled cord 4. A magnet opening 11 is also shown here. The vicinity of the magnet, and therefore of the movement unit 2, can be determined by placing a coil in duct 8.

Figure 7:
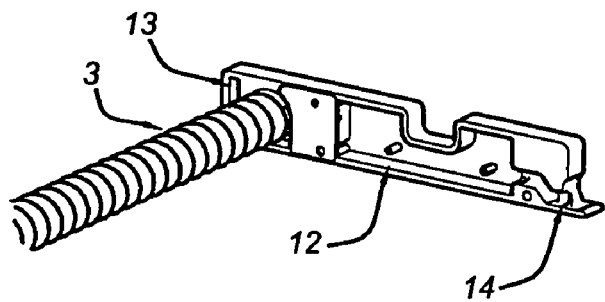
FIG. 7 shows a further detail of the vehicle sliding door actuator of FIG. 1.

FIG. 7 shows an end cap or end part 12, preferably made of plastic, preferably a plastics end part provided with pull relief as end cap on the extruded aluminium section 1 of the preceding figures. Said end part 12 is provided with a pin, which extends partly inside the heart or open core of the coiled cord 3. Furthermore, the end part 12 is provided with an inlet part 13, which during fitting connects to duct 8, and into which the cables of sensors of the cable duct 8 can be fed. The duct 8, in which the sensors can be fitted also serve here as the cable duct for the cables of said sensors. The cables of the sensors and the cable of the coiled cord run through the end cap 12 up to the pull relief 5 and leave the end part 12 together through one outlet at that point.

In an embodiment, the movement unit 2 will be provided with control electronics. This control electronics can comprise a send and transmission unit which can send and receive information, and operates for instance via Bluetooth, wifi, or another wireless coupling. This allows the control electronics to be read out via a mobile computing device, like a PDA. In that way, information from the control electronics, for instance how often the sliding door was opened, and at what time the sliding door was opened, can easily be obtained and stored for later use. To that end, the control electronics inside the movement unit 2 should comprise a counter, a time registration device, a memory.

Figure 8:
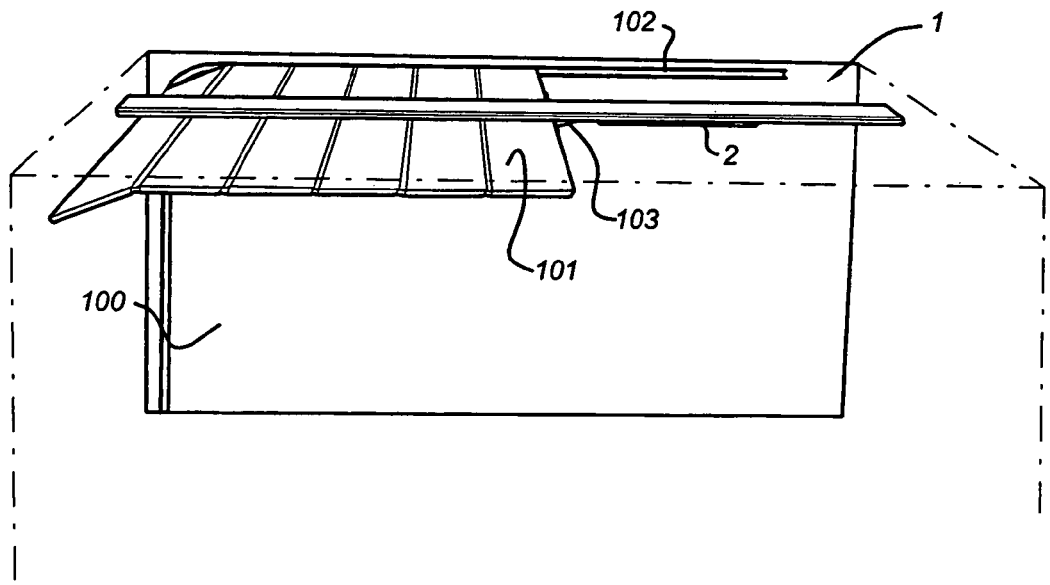
FIG. 8 shows an overview of a cargo space with a sliding door and an actuator of FIG. 1.

In FIG. 8, cargo space 100 of for instance a lorry is shown which is closed of by means of a sliding door 101. In this embodiment, the sliding door 101 runs in two rails 102 (only one side is shown). The profile section 1 is mounted against the roof of the cargo space 100, and via a coupling 103 the movement unit 2, which is able to run along the profile section 1, is coupled to the sliding door 101 to take is along as it runs along the profile section 1.

Figure 9:
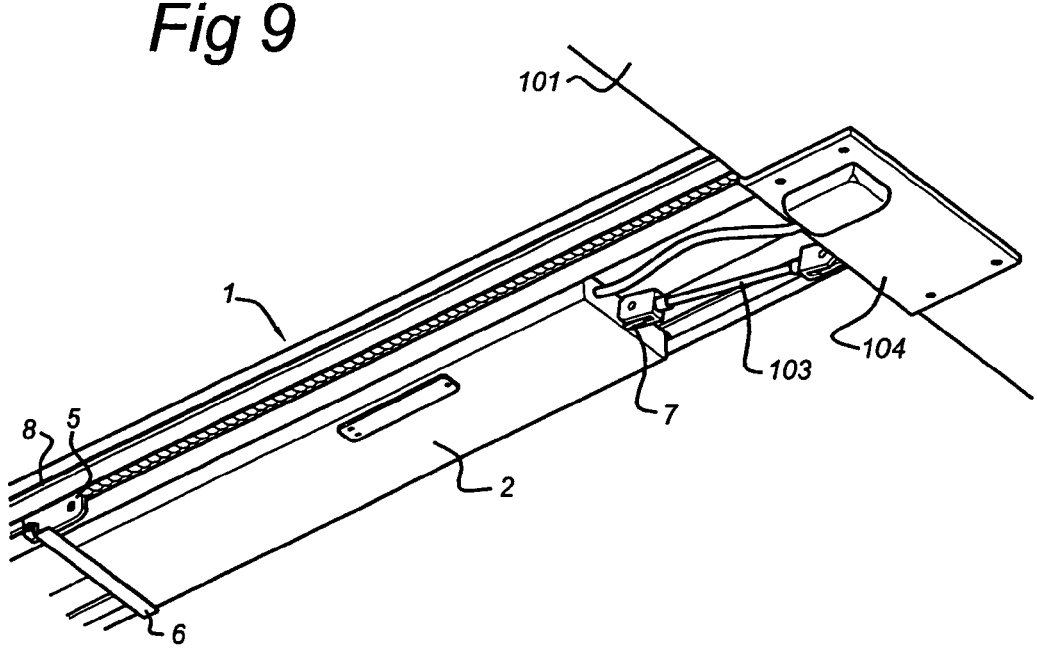
FIG. 9 shows in more detail the actuator connected to a sliding door.

In FIG. 9, the profile section 1 in its mounted position and coupled to a sliding door 101 is shown in more detail. The fixing part 7 is attached to coupling 103, hingedly, and the other end of coupling 103 is again hingedly coupled to attachment plate 104 which is mounted of fixed to the upper side of sliding door 101. In that way, when movement unit 102 runs along profile section 1, it take the sliding door 101 along.

It may also be possible to read out internal climatologic conditions inside the cargo space, for instance temperature and humidity. To that end, the control electronics should be operationally coupled to various sensors described above.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

I claim:

1. A vehicle sliding door actuator comprising a profile section provided with a rail track in which a movement unit is placed so as to be movable, and a cable duct to the rail track, and provided with a coiled cord in the cable duct which at one end is connected to the movement unit and at the coiled cord's other end near one end of the cable duct.

2. The vehicle sliding door actuator according to claim 1, wherein the cable duct is co-moulded on the profile section and forms part of said profile section.

3. The vehicle sliding door actuator according to claim 1, further comprising a sensor duct along the cable duct, preferably co-moulded along the cable duct, preferably forming part of the profile section, for fitting sensors in said sensor duct and for passing cables for the sensors through the sensor duct.

4. The vehicle sliding door actuator according to claim 1, furthermore comprising a pull relief, preferably made of plastic, at one end of the movement unit, which is furthermore connected at one end of the coiled cord.

5. The vehicle sliding door actuator according to claim 4, wherein the pull relief comprises a guide part which is formed in order to run in the cable duct.

6. The vehicle sliding door actuator according to claim 4, wherein the pull relief comprises an engagement part extending outside the cable duct.

7. The vehicle sliding door actuator according to claim 1, further comprising an end part on one end of the rail track, preferably made of plastic.

8. The vehicle sliding door actuator according to claim 7, in which the end part has a cable inlet which connects to the cable duct and a cable outlet provided with a pull relief.

9. A vehicle comprising a load compartment provided with a loading opening, a sliding door for closing off the loading opening, and a vehicle sliding door actuator according to claim 1 for operating the sliding door, wherein the profile section is fitted in the load compartment against an upper side thereof, and wherein one end of the movement unit is connected to the sliding door.

* * * * *